United States Patent
Jeon et al.

(10) Patent No.: US 9,708,703 B2
(45) Date of Patent: Jul. 18, 2017

(54) HIGH-MANGANESE HOT-ROLLED GALVANIZED STEEL SHEET AND MANUFACTURING METHOD THEREOF

(71) Applicant: POSCO, Pohang-si, Gyeongsangbuk-do (KR)

(72) Inventors: Sun-Ho Jeon, Gwangyang-si (KR); Kwang-Geun Chin, Gwangyang-si (KR)

(73) Assignee: POSCO, Pohang-si, Gyeongsangbuk-Do (KR)

( * ) Notice: Subject to any disclaimer, the term of this patent is extended or adjusted under 35 U.S.C. 154(b) by 0 days.

(21) Appl. No.: 14/369,114

(22) PCT Filed: Dec. 27, 2012

(86) PCT No.: PCT/KR2012/011531
§ 371 (c)(1),
(2) Date: Jun. 26, 2014

(87) PCT Pub. No.: WO2013/100610
PCT Pub. Date: Jul. 4, 2013

(65) Prior Publication Data
US 2014/0377585 A1    Dec. 25, 2014

(30) Foreign Application Priority Data
Dec. 27, 2011  (KR) .................. 10-2011-0143889

(51) Int. Cl.
*B32B 15/00* (2006.01)
*C23C 2/02* (2006.01)
(Continued)

(52) U.S. Cl.
CPC ............. *C23C 2/02* (2013.01); *B32B 15/013* (2013.01); *C21D 6/005* (2013.01); *C21D 8/0205* (2013.01);
(Continued)

(58) Field of Classification Search
None
See application file for complete search history.

(56) References Cited

U.S. PATENT DOCUMENTS

2003/0054195 A1    3/2003  Ishii et al.
2006/0292391 A1*  12/2006  Ikematsu et al. ............. 428/659
(Continued)

FOREIGN PATENT DOCUMENTS

CN    1395623    2/2003
CN    1771344    5/2006
(Continued)

OTHER PUBLICATIONS

International Search Report from the Korean Patent Office for International Application No. PCT/KR2012/01153 mailed Apr. 24, 2013.
(Continued)

*Primary Examiner* — Daniel J Schleis
(74) *Attorney, Agent, or Firm* — Finnegan, Henderson, Farabow, Garrett & Dunner, LLP

(57) ABSTRACT

A high-manganese hot-rolled galvanized steel sheet having no surface defects and improved galvanizing and alloying characteristics is manufactured by using a high-manganese hot-rolled steel sheet. Provided are the high-manganese hot-rolled galvanized steel sheet and a method of manufacturing the high-manganese hot-rolled galvanized steel sheet. The high-manganese hot-rolled galvanized steel sheet includes: a hot-rolled steel sheet including 5 wt % to 35 wt % manganese; and a zinc coating layer formed on the hot-rolled steel sheet, wherein an internal oxide layer is formed in an internal region of the hot-rolled steel sheet facing the zinc coating layer.

3 Claims, 1 Drawing Sheet

(51) Int. Cl.

| | | |
|---|---|---|
| *C23C 2/06* | (2006.01) | |
| *C22C 38/04* | (2006.01) | |
| *C22C 38/58* | (2006.01) | |
| *C23C 2/26* | (2006.01) | |
| *C23C 2/28* | (2006.01) | |
| *B32B 15/01* | (2006.01) | |
| *C22C 38/00* | (2006.01) | |
| *C22C 38/02* | (2006.01) | |
| *C22C 38/06* | (2006.01) | |
| *C22C 38/50* | (2006.01) | |
| *C22C 38/54* | (2006.01) | |
| *C21D 6/00* | (2006.01) | |
| *C21D 8/02* | (2006.01) | |
| *C22C 38/34* | (2006.01) | |

(52) U.S. Cl.
CPC ......... *C21D 8/0263* (2013.01); *C21D 8/0284* (2013.01); *C22C 38/00* (2013.01); *C22C 38/008* (2013.01); *C22C 38/02* (2013.01); *C22C 38/04* (2013.01); *C22C 38/06* (2013.01); *C22C 38/50* (2013.01); *C22C 38/54* (2013.01); *C22C 38/58* (2013.01); *C23C 2/06* (2013.01); *C23C 2/26* (2013.01); *C23C 2/28* (2013.01); *C22C 38/34* (2013.01); *Y10T 428/12799* (2015.01)

(56) References Cited

U.S. PATENT DOCUMENTS

2009/0053556 A1* 2/2009 Sohn et al. .................. 428/659
2009/0123651 A1   5/2009 Okada

FOREIGN PATENT DOCUMENTS

| CN | 101760712 | | 6/2010 |
|---|---|---|---|
| EP | 2 479 667 | | 2/2014 |
| JP | 04-259325 | | 9/1992 |
| JP | 2001-342541 | A | 12/2001 |
| JP | 2006-233333 | | 9/2006 |
| JP | 2009-521596 | | 6/2009 |
| JP | 2010-150660 | | 7/2010 |
| KR | 10-2002-0053851 | A | 7/2002 |
| KR | 10-2007-0122581 | A | 12/2007 |
| KR | 10-2005-0070509 | A | 7/2009 |
| KR | 10-2010-0073819 | A | 7/2010 |
| KR | 20100073819 | * | 7/2010 |
| KR | 2011-0009792 | | 1/2011 |
| KR | 2011-0087800 | | 8/2011 |
| WO | WO 93/13233 | | 7/1993 |
| WO | WO 99/01585 | | 1/1999 |
| WO | WO 02/101109 | | 12/2002 |
| WO | WO 2007-043273 | | 4/2007 |
| WO | WO 2009/084793 | A1 | 7/2009 |
| WO | WO 2010-122097 | | 10/2010 |

OTHER PUBLICATIONS

First Office Action from the State Intellectual Property Office of the People's Republic of China, issued on Jul. 9. 2015 in counterpart Chinese Patent Application No. 2012800706201.

Notice of Office Action from the Japanese Patent Office issued Jul. 14, 2015 in Japanese Patent Application No. 2014-550000.

Decision of Rejection with English-language translation issued by Japanese patent Office on Mar. 15, 2016 in counterpart Japanese application No. 2014-550000.

English-language Extended Search Report from the European Patent Office, in counterpart European Application No. EP 12863 111, mailed Jan. 20, 2016.

* cited by examiner

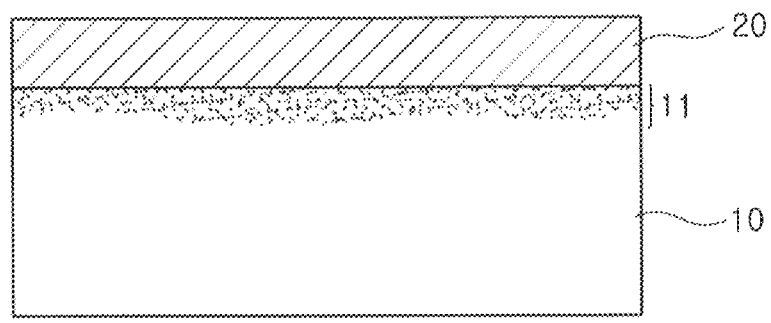

HIGH-MANGANESE HOT-ROLLED GALVANIZED STEEL SHEET AND MANUFACTURING METHOD THEREOF

TECHNICAL FIELD

The present disclosure relates to a high-manganese hot-rolled galvanized steel sheet for frames of automobiles or structural members.

BACKGROUND ART

Hot-rolled galvanized steel sheets (such as hot-rolled hot-dip galvanized steel sheets and hot-rolled hot-dip galvanized steel sheets) are manufactured by coating hot-rolled steel sheets, and thus are economical as compared with the case of coating cold-rolled steel sheets because a cold rolling process and an annealing process are not required for producing the hot-rolled galvanized steel sheets.

In general, hot-rolled hot-dip galvanized steel sheets and hot-rolled hot-dip galvannealed steel sheets are manufacturing from hot-rolled steel sheets by pickling the hot-rolled steel sheets to remove scale formed during a hot rolling process, heating the hot-rolled steel sheets to a temperature of 480° C. to 550° C., which is slightly higher than the temperature of a galvanizing bath, and coating the hot-rolled steel sheets. Consequently, coating failure caused by surface concentration of alloying elements, or coating defects such as peeling of a coating layer are not present on the hot-rolled hot-dip galvanized steel sheets and hot-rolled hot-dip galvannealed steel sheets.

However, if austenitic high-manganese hot-rolled steel sheets (refer to Patent Documents 1 to 4) having strength and ductility markedly improved by adding manganese in an amount of 5% to 35% to form twin crystals during plastic deformation are coated, easily oxidizable alloying elements such as aluminum (Al) and silicon (Si) as well as manganese (Mn) are selectively oxidized when the austenitic high-manganese hot-rolled steel sheets are heated to a temperature of 480° C. to 550° C. for hot-dip galvanizing, and thus, thick oxide films are formed thereon to result in coating failure and peeling of a coating layer.

To remove such an oxide film from a high-manganese hot-rolled steel sheet, the high-manganese hot-rolled steel sheet may be pickled and heated under a nitrogen atmosphere containing hydrogen so as to activate the surface of the high-manganese hot-rolled steel and increase the temperature of the high-manganese hot-rolled steel to a value suitable for a coating process. The nitrogen atmosphere containing hydrogen reduces oxidation of iron (Fe, the steel sheet) and easily oxidizable elements such as manganese (Mn), silicon (Si), and aluminum (Al).

Therefore, if high-manganese steel including large amounts of aluminum and silicon in addition to a large amount of manganese is heated under such an atmosphere, such alloying elements may be selectively oxidized by a small amount of moisture or oxygen included in the atmosphere, and thus, manganese, aluminum, and silicon oxides may be formed on the high-manganese steel (a material to be coated).

That is, if a high-manganese steel sheet including large amounts of aluminum and silicon as well as a large amount of manganese is coated, since oxides are formed on the surface of the high-manganese steel sheet during a heat treatment process before a coating process, coating failure may be caused, or a coating layer may be peeled from the high-manganese steel sheet in a later processing process.

Patent Document 5 discloses a technique for preventing coating failure when a high-manganese hot-rolled steel sheet is coated by a hot-dip galvanizing method. According to Patent Document 5, surface scale is removed from a high-manganese hot-rolled steel sheet with an acid solution, and a nickel (Ni) plating layer is continuously formed on the high-manganese hot-rolled steel sheet to a density of 50 mg/m$^2$ to 100 mg/m$^2$, so as to prevent alloying elements such as manganese, aluminum, and silicon from concentrating on the surface of the high-manganese hot-rolled steel sheet in a later heat treatment process.

However, although being effective in preventing surface concentration of silicon and manganese, the nickel plating layer, formed before the heat treatment process, is not effective in preventing surface concentration of aluminum. Moreover, the nickel plating layer may facilitate diffusion of aluminum to result in an aluminum oxide (Al—O) on the nickel plating layer, and thus, coating failure or peeling of a coating layer may be caused.

That is, when a high-manganese hot-rolled steel sheet including a large amount of manganese is coated, since oxides of manganese, aluminum, silicon, or a combination thereof are formed on the steel sheet to a large thickness during a heat treatment process, coating failure may occur in a later hot-dip galvanizing process, or a coating layer may be peeled from the steel sheet in a later processing process. Therefore, technology for solving this limitation is required.

(Patent Document 1) Japanese Patent Application Laid-open Publication No. H4-259325

(Patent Document 2) International Patent Publication No. WO93/013233

(Patent Document 3) International Patent Publication No. WO99/001585

(Patent Document 4) International Patent Publication No. WO02/101109

(Patent Document 5) Korean Patent Application Laid-open Publication No. 2010-0007400

DISCLOSURE

Technical Problem

An aspect of the present disclosure may provide a high-manganese hot-rolled galvanized steel sheet which is formed of a hot-rolled steel sheet containing a large amount of manganese (Mn) and has no surface defect such as a ripple mark, no coating defect such as coating failure or peeling of a coating layer, and no alloying defect such as alloying failure or over-alloying. Another aspect of the penetration depth may provide a method of manufacturing the high-manganese hot-rolled galvanized steel sheet.

Technical Solution

According to an aspect of the present disclosure, a high-manganese hot-rolled galvanized steel sheet may include: a hot-rolled steel sheet including 5 wt % to 35 wt % manganese; and a zinc coating layer formed on the hot-rolled steel sheet, wherein an internal oxide layer may be formed in an internal region of the hot-rolled steel sheet facing the zinc coating layer.

According to another aspect of the present disclosure, a method of manufacturing a high-manganese hot-rolled galvanized steel sheet may include: preparing a steel slab including 5 wt % to 35 wt % manganese; hot-rolling the steel slab to form a hot-rolled steel sheet; coiling the hot-rolled steel sheet at a temperature of 500° C. to 700° C.; performing a heat treatment on the coiled hot-rolled steel sheet within a dew point range of −10° C. to −80° C. and a heating temperature range of 480° C. to 600° C.; cooling the heat-treated hot-rolled steel sheet to a temperature of 480° C. to 500° C.; and galvanizing the cooled hot-rolled steel sheet.

Advantageous Effects

According to the present disclosure, a high-manganese hot-rolled galvanized steel sheet having superior coating characteristics and alloying characteristics may be manufactured by a general manufacturing method not requiring an additional process. The high-manganese hot-rolled galvanized steel sheet may have no surface defect such as a ripple mark, no coating defect such as coating failure or peeling of a coating layer, and no alloying defect such as alloying failure or over-alloying.

DESCRIPTION OF DRAWINGS

FIG. 1 is a schematic cross-sectional view illustrating a high-manganese hot-rolled galvanized steel sheet according to an embodiment of the present disclosure.

BEST MODE

The inventors have conducted research into the reason of coating failure when forming a high-manganese hot-rolled galvanized steel sheet by galvanizing a high-manganese hot-rolled steel sheet containing large amounts of manganese (Mn), aluminum (Al), and silicon (Si), and have found that a thick Mn or Mn—Al—Si oxide film is formed in a non-coated region and an oxide film having a different thickness is formed at the interface with a coating layer. Such a hot-rolled galvanized steel sheet was evaluated by a bending test (processing test), and complete peeling of a coating layer from base steel (the hot-rolled steel sheet) was observed.

The reason for this was considered as follows. A decrease in the wettability between zinc and a thick Mn or Al oxide film formed on base steel during a heat treatment process performed before a coating process has caused a coating failure or formation of a local coating layer only covering an oxide film without an interfacial inhibition layer (alloying layer) between the coating layer and the base steel.

Therefore, the inventors have researched to prevent coating failure and peeling of a coating layer when galvanizing a high-manganese hot-rolled steel sheet, and found that the formation of a surface oxide layer caused by diffusion of elements such as manganese (Mn) and aluminum (Al) from the inside of a steel sheet to the surface of the steel sheet could be prevented by optimizing process conditions to form an oxide layer just below the surface of the steel sheet before a galvanizing process. Then, based on this knowledge, the inventors have invented a high-manganese hot-rolled galvanized steel sheet of the present disclosure. That is, the inventors have found that a high-manganese hot-rolled galvanized steel sheet having improved coating characteristics and alloying characteristics could be manufactured without causing surface defects such as a ripple mark in the case of a hot-dip galvanizing process is performed, coating failure, peeling of a coating layer, and alloying defects such alloying failure or over-alloying.

Embodiments of the present disclosure will now be described in detail.

First, a hot-rolled galvanized steel sheet will be described in detail according to an embodiment of the present disclosure.

According to the embodiment of the present disclosure, the hot-rolled galvanized steel sheet includes a hot-rolled steel sheet containing 5 wt % to 35 wt % manganese and a zinc coating layer formed on the hot-rolled steel sheet, wherein an internal oxide layer is formed in an internal region of the hot-rolled steel sheet facing the zinc coating layer.

The inventors found that when a hot-rolled galvanized steel sheet is manufactured by using a high-manganese steel sheet, the thickness and morphology of an internal oxide layer formed in the steel sheet are markedly varied according to the temperature in a coiling process.

That is, the thickness and morphology of oxides formed in a high-manganese hot-rolled steel sheet is determined by a difference between the rate of diffusion of oxygen into the steel sheet and the rate of diffusion of alloying elements such as manganese (Mn) from the inside of the steel sheet to the surface of the steel sheet. If the rate of diffusion of oxygen into the steel sheet is greater than the rate of diffusion of alloying elements such as manganese (Mn) from the inside of the steel sheet to the surface of the steel sheet, the oxygen reacts with easily oxidizable alloying elements such as manganese (Mn), silicon (Si), and Aluminum (Al) to form Mn—Si—Al oxides in the inside of the steel sheet, and along with this, oxides are formed on the surface of the steel sheet. However, the rate of diffusion of alloying elements such as manganese (Mn), aluminum (Al), and silicon (Si) from the inside of the steel sheet to the surface of the steel sheet is greater than the rate of diffusion of oxygen into the steel sheet, oxides are not formed in the steel sheet but are only formed on the surface of the steel sheet.

Since the diffusion rates of oxygen and alloying elements in steel is dependent on temperature (refer to the Arrhenius equation), the diffusion coefficients and rates of oxygen and alloying elements increase in proportion to a coiling temperature of hot-rolled steel sheet. However, since the diffusion rate of oxygen in high-manganese steel is 100 to 1000 times the diffusion rate of alloying elements in the high-manganese steel, the difference between the diffusion rates of oxygen and alloying elements is increased in proportion to the coiling temperature of high-manganese hot-rolled steel sheet.

Therefore, if an internal oxide layer is formed in a steel sheet by controlling the coiling temperature of hot-rolled steel sheet, the internal oxide layer may function as a barrier against surface diffusion and oxidation of easily oxidizable alloying elements such as manganese (Mn), silicon (Si), and aluminum (Al) in a heat treatment process after a pickling process. If a high-manganese hot-rolled steel sheet in which an internal oxide layer is formed is pickled and heat-treated, since surface concentration and oxidation of alloying elements are prevented, the wettability of the high-manganese hot-rolled steel sheet with molten zinc is increased during a hot-dip galvanizing process.

FIG. 1 is a schematic cross-sectional view illustrating a high-manganese hot-rolled galvanized steel sheet according to an embodiment of the present disclosure. Referring to FIG. 1, a zinc coating layer 20 is formed on a base steel sheet 10, and an internal oxide layer 11 is formed in the base steel sheet 10. The internal oxide layer 11 may be formed during a hot coiling process as described above and may prevent diffusion of alloying elements of the base steel sheet 10 in a heat treatment process after a pickling process, and thus, the formation of oxides on the surface of the base steel sheet 10 may be suppressed to improve coating characteristics of the base steel sheet 10.

It may be preferable that the thickness of the internal oxide layer 11 be within the range of 1 μm to 5 μm. If the thickness of the internal oxide layer 11 is less than 1 μm, the surface concentration and oxidation of alloying elements such as manganese (Mn) may occur due to poor or uneven formation of internal oxides, and thus, coating failure or peeling of a coating layer in a later processing process may be caused. On the other hand, if the thickness of the internal oxide layer 11 is greater than 5 μm, oxides may be formed along thermodynamically unstable grain boundaries in a deep region of the base steel sheet 10, and such grain boundary oxides may not be removed in a pickling process before a coating process. In this case, coating failure may be observed along grain boundaries, or peeling of a coating layer may be observed in a processing process.

The hot-rolled steel sheet 10 is a high-manganese hot-rolled steel sheet 10 containing 5 wt % to 35 wt % manganese, and the other elements of the hot-rolled steel sheet 10 are not limited. For example, the hot-rolled steel sheet 10 may include, by wt %, C: 0.1% to 1.5%, Mn: 5% to 35%, Si: 0.1% to 3%, Al: 0.01% to 6%, Ni: 0.1% to 1.0%, Cr: 0.1% to 0.4%, Sn: 0.01% to 0.2%, Ti: 0.01% to 0.2%, B: 0005% to 0.006%, and the balance of Fe and inevitable impurities.

In addition, an interfacial inhibition layer may be formed of Fe—Al—Mn between the zinc coating layer 20 and the base steel sheet 10 in which the internal oxide layer 11 is formed.

Hereinafter, a method of manufacturing the high-manganese hot-rolled galvanized steel sheet will be described in detail according to an embodiment of the present disclosure.

The method may include:

preparing a steel slab including 5 wt % to 35 wt % manganese;

hot-rolling the steel slab to form a hot-rolled steel sheet;

coiling the hot-rolled steel sheet at a temperature of 500° C. to 700° C.;

performing a heat treatment on the coiled hot-rolled steel sheet within a dew point range of −10° C. to −80° C. and a heating temperature range of 480° C. to 600° C.;

cooling the heat-treated hot-rolled steel sheet to a temperature of 480° C. to 500° C.; and galvanizing the cooled hot-rolled steel sheet.

In detail, first, a steel slab including 5 wt % to 35 wt % manganese is reheated and hot-rolled to form a hot-rolled steel sheet. The reheating and hot rolling may be performed by a conventional method known in the related art. That is, the methods of reheating and hot rolling are not limited.

The steel slab and the hot-rolled steel sheet have substantially the same composition, and in the embodiment of the present disclosure, the composition is not limited. For example, the composition thereof may include, by wt %, C: 0.1% to 1.5%, Mn: 5% to 35%, Si: 0.1% to 3%, Al: 0.01% to 6%, Ni: 0.1% to 1.0%, Cr: 0.1% to 0.4%, Sn: 0.01% to 0.2%, Ti: 0.01% to 0.2%, B: 0005% to 0.006%, and the balance of Fe and inevitable impurities.

The hot-rolled steel sheet is coiled at a temperature of 500° C. to 700° C. If the coiling temperature is lower than 500° C., internal oxides may be unevenly formed or may not be formed. In this case, alloying elements may be selectively oxidized in a heat treatment process after a pickling process to result in coating failure or peeling of a coating layer. On the other hand, if the coiling temperature is higher than 700° C., due to a high diffusion rate of oxygen in the hot-rolled steel sheet, a very thick internal oxide layer may be formed in the hot-rolled steel sheet, and grain boundary oxidation may occur along grain boundaries in a deep region of the hot-rolled steel sheet. Since grain boundaries are thermodynamically unstable as compared with the insides of grains, oxidation may occur first along the grain boundaries, and alloying elements may concentrate intensively along the grain boundaries. Therefore, grain boundary oxides may be Al—Si—Mn—(Fe) oxides containing alloying elements such as manganese (Mn), aluminum (Al), and silicon (Si), and may not be removed in a pickling process performed before a coating process, thereby causing coating failure along grain boundaries.

It may be preferable that the coiling be performed for 1.5 hours to 2.5 hours. If the coiling is performed for shorter than 1.5 hours, internal oxides may be unevenly formed. On the other hand, although the coiling is performed for longer than 2.5 hours, the formation of internal oxides may not be substantially affected. Therefore, it may be preferable that the coiling be performed for shorter than 2.5 hours. More preferably, the coiling may be performed for 2.0 hours.

The coiled hot-rolled steel sheet is heat-treated in conditions of a dew point range of −10° C. to −80° C. and a heating temperature range of 480° C. to 600° C. If the dew point is higher than −10° C., since an oxidizing atmosphere is substantially formed, surface concentration and oxidation of alloying elements are not completely prevented by internal oxides. Accordingly, oxidation may occur even on the surface of the hot-rolled steel sheet, and an oxide film may be formed on the surface of the hot-rolled steel sheet to result in coating failure in a later galvanizing process and peeling of a coating layer. Although the surface concentration of manganese (Mn) is suppressed as the dew point increases, many refining apparatuses may be required to remove oxygen or moisture from gas for maintaining the dew point of the gas at a value lower than −80° C.

Surface concentration and oxidation of alloying elements may be suppressed more effectively in reverse proportion to the heating temperature of the hot-rolled steel sheet. However, if the heating temperature is lower than the temperature of the galvanizing bath used in a later coating process, the galvanizing bath is cooled by the hot-rolled steel sheet. Therefore, the hot-rolled steel sheet may be heated to a temperature higher than the temperature of the galvanizing bath. For example, it may be preferable that the hot-rolled steel sheet may be heated to 480° C. or higher. If the heating temperature of the hot-rolled steel sheet is higher than 600° C., surface concentration and oxidation of alloying elements such as manganese (Mn) may occur to worsen coating characteristics of the hot-rolled steel sheet. This may be prevented by increasing the coiling temperature of the hot-rolled steel sheet to form a thicker internal oxide layer. In this case, however, grain boundary oxidation may occur to result in coating failure along grain boundaries or peeling of a coating layer and result in a decrease in the strength of the hot-rolled steel sheet. Accordingly, it may be preferable that the hot-rolled steel sheet be heated to a temperature of 480° C. to 600° C.

After heating, the hot-rolled steel sheet is cooled to a temperature of 480° C. to 500° C. Through this cooling, the dipping temperature of the hot-rolled steel sheet is controlled. Basically, the dipping temperature of the hot-rolled steel sheet is adjusted to be higher than the temperature of the galvanizing bath. If the dipping temperature of the hot-rolled steel sheet is lower than the temperature of the galvanizing bath, an interfacial inhibition layer may be poorly formed because the hot-rolled steel sheet is dipped in the galvanizing bath at a low temperature, and it may be difficult to control the temperature of the galvanizing bath because the galvanizing bath is cooled by the hot-rolled steel sheet. Therefore, generally, the hot-rolled steel sheet may be cooled to a temperature higher than the temperature of the galvanizing bath. For example, the hot-rolled steel sheet may be cooled to a temperature of 480° C. or higher. On the other hand, if the dipping temperature of the hot-rolled steel sheet is higher than 500° C., due to a large amount of latent heat, a ripple mark may be formed on the hot-rolled steel sheet when the hot-rolled steel sheet is cooled after a coating process, and thus, the appearance of the hot-rolled steel sheet may be spoiled.

Thereafter, the hot-rolled steel sheet is galvanized to form a zinc coating layer thereon. The hot-rolled steel sheet may be galvanized by a hot-dip galvanizing method or a hot-dip galvannealing method. These methods will now be described in detail.

According to the hot-dip galvanizing method, the hot-rolled steel sheet may be dipped in a hot-dip galvanizing bath containing 0.13 wt % to 0.25 wt % aluminum (Al) and having a temperature of 460° C. to 500° C.

The aluminum (Al) contained in the galvanizing bath first reacts with the hot-rolled steel sheet when the hot-rolled steel sheet is dipped in the galvanizing bath after being heated. This reduces an oxide film formed on the surface of the hot-rolled galvanized steel sheet and forms a Fe—Mn—Al—Zn film as a ductile interfacial inhibition layer suppressing the growth of a brittle Zn—Fe intermetallic compound. Therefore, the content of aluminum contained in the galvanizing bath may be maintained at a high value. However, if the content of aluminum is greater than 0.25 wt %, floating Fe—Al dross may be easily formed, and a ripple mark may be formed because a coating layer flows down. Therefore, the upper limit of the content of aluminum may be set to be 0.25 wt %. Since the hot-rolled steel sheet is a high-manganese steel sheet having an internal oxide layer, surface concentration and oxidation of alloying elements may not occur, and although the galvanizing bath has a low aluminum content of 0.13 wt % as compared with a general galvanizing bath, a Fe—Mn—Al—Zn film may be formed as a ductile interfacial inhibition layer. However, if the content of aluminum in the galvanizing bath is less than 0.13 wt %, a Zn—Fe alloying layer may be locally formed during a cooling process because of latent heat in the hot-rolled steel sheet, and accordingly, a coating layer may be peeled in a later processing process.

If the temperature of the galvanizing bath is lower than 460° C., the fluidity of molten zinc contained in the galvanizing bath may be lowered, and thus, sink roll marks and a ripple mark may be formed on the hot-rolled galvanized steel sheet. On the other hand, if the temperature of the galvanizing bath is higher than 500° C., the wettability of the hot-rolled steel sheet may be improved. However, due to a high degree of fluidity, a ripple mark may be formed on the hot-rolled galvanized steel sheet when the hot-rolled steel sheet is cooled after being coated, and accordingly, the appearance of the hot-rolled galvanized steel sheet may be spoiled.

According to the hot-dip galvannealing method, a coating process may be performed on the hot-rolled steel sheet by dipping the hot-rolled steel sheet in a hot-dip galvanizing bath containing 0.08 wt % to 0.13 wt % aluminum and having a temperature of 460° C. to 500° C., and then an alloying treatment may be performed on the galvanized hot-rolled steel sheet at a temperature of 500° C. to 560° C.

If the content of aluminum in the galvanizing bath is less than 0.08 wt %, an uneven interfacial inhibition layer may be formed along grain boundaries, and alloying may first occur at the grain boundaries to result in local over-alloying. Furthermore, in a later processing process, a coating layer may be peeled in the form of powder (known as powdering). On the other hand, if the content of aluminum is greater than 0.13 wt %, a thick interfacial inhibition layer may be formed to retard an alloying reaction, and this may increase the temperature of alloying and cause powdering.

Due to the alloying treatment performed after the galvanizing process, a Fe—Zn—Mn alloying layer (three-element alloying layer) is formed on the steel sheet unlike a Fe—Zn alloying layer (two-element alloying layer) formed on a general steel sheet. In the embodiment of the present disclosure, since diffusion of manganese (Mn) into the coating layer is blocked by the internal oxide layer formed in the steel sheet, alloying is retarded. Therefore, the alloying treatment may be performed at 500° C. or higher, which is higher than that of an alloying treatment for a general steel sheet. However, if the alloying treatment is performed at a temperature higher than 560° C., excessive mutual diffusion may occur between the steel sheet and the coating layer to result in over-alloying, and alloying failure such as powdering may occur in a later processing process.

MODE FOR INVENTION

Hereinafter, examples of the present disclosure will be described in detail. The following examples are for illustrative purposes and are not intended to limit the scope of the present disclosure.

EXAMPLE 1

Slabs including, by wt %, 0.7% C, 15.3% Mn, 0.6% Si, 2% Al, 0.3% Ni, 0.3% Cr, 0.05% Sn, 1.2% Ti, and 0.005% B were hot-rolled to form hot-rolled steel sheets having a thickness of 2.2 mm. The hot-rolled steel sheets were coiled under the conditions shown in Tables 1 and 2. Thereafter, the steel sheets were treated with an acid solution to remove surface scale therefrom. Then, the steel sheets were heat-treated under an atmosphere including 5% hydrogen and nitrogen as a remainder according to the conditions shown in Tables 1 and 2. Next, the steel sheets were cooled to 480° C., and a hot-dip galvanizing process was performed on the steel sheets for three to five seconds under the conditions shown in Tables 1 and 2. Thereafter, the amount of coating layers formed on both sides of each of the steel sheet was adjusted to be 45 g/m² by an air knife. In this way, hot-rolled galvanized steels sheets were manufactured.

The hot-rolled galvanized steel sheets manufactured under the conditions shown in Table 1 were tested to evaluate the formation of internal oxides and coating qualities thereof. Results of the test are shown in Table 1. In addition, the hot-rolled galvanized steel sheets manufactured under the conditions shown in Table 2 were tested to evaluate coating qualities thereof, and results of the test are shown in Table 2.

The degree of coating failure was evaluated by capturing a surface image after the hot-dip galvanizing process and calculating the area of a non-coated region. Then, the degree of coating failure was graded as follows.

Grade 1: Non-coated regions are not observed
Grade 2: the average diameter of non-coated regions is less than 1 mm
Grade 3: the average diameter of non-coated regions ranges from 1 mm to 2 mm
Grade 4: the average diameter of non-coated regions ranges from 2 mm to 3 mm
Grade 5: the average diameter of non-coated regions is 3 mm or greater.

After performing a bending test using an overlay tester (OT), a taping test was performed on outer sides of bent portions, and peeling of coating layers was observed.

In this way, the degree of adhesion of the coating layers was evaluated and graded as follows.

Grade 1: no peeling
Grade 2: peeling is less than 5%
Grade 3: peeling is 5% to less than 10%
Grade 4: peeling is 10% to less than 30%
Grade 5: peeling is less than 30%

In addition, the formation of a ripple mark was observed with the naked eye.

TABLE 1

| | Coiling | | Heating | | | | Galvanizing bath | | Internal | Coating characteristics | | |
|---|---|---|---|---|---|---|---|---|---|---|---|---|
| No. | Te, (°C.) | Time (h) | Hydrogen content (%) | Dew point (°C.) | Heating Te, (°C.) | Time (sec) | Al content (%) | Te, (°C.) | oxide layer (μm) | Coating grades | Coating adhesion | Notes |
| 1 | 750 | 2 | 5 | −40 | 480 | 40 | 0.23 | 460 | 15 (grain boundary oxidation) | 4 | 5 | *CS |
| 2 | 700 | 2 | 5 | −40 | 480 | 40 | 0.23 | 460 | 5 | 2 | 1 | **IS |
| 3 | 650 | 2 | 5 | −40 | 480 | 40 | 0.23 | 460 | 4.5 | 1 | 1 | IS |
| 4 | 600 | 2 | 5 | −40 | 480 | 40 | 0.23 | 460 | 3 | 1 | 1 | IS |
| 5 | 550 | 2 | 5 | −40 | 480 | 40 | 0.23 | 460 | 2.5 | 1 | 1 | IS |
| 6 | 500 | 2 | 5 | −40 | 480 | 40 | 0.23 | 460 | 1 | 2 | 1 | IS |
| 7 | 450 | 2 | 5 | −40 | 480 | 40 | 0.23 | 460 | Uneven | 4 | 5 | CS |
| 8 | 400 | 2 | 5 | −40 | 480 | 40 | 0.23 | 460 | 0 | 5 | 5 | CS |
| 9 | 750 | 1.5 | 5 | −40 | 480 | 40 | 0.23 | 460 | 15 (grain boundary oxidation) | 3 | 5 | CS |
| 10 | 750 | 1 | 5 | −40 | 480 | 40 | 0.23 | 460 | 12 (grain boundary oxidation) | 3 | 5 | CS |
| 11 | 500 | 1 | 5 | −40 | 480 | 40 | 0.23 | 460 | Uneven | 3 | 5 | CS |
| 12 | 500 | 1.5 | 5 | −40 | 480 | 40 | 0.23 | 460 | 2.1 | 2 | 1 | IS |
| 13 | 500 | 2.5 | 5 | −40 | 480 | 40 | 0.23 | 460 | 2.5 | 2 | 1 | IS |
| 14 | 500 | 3 | 5 | −40 | 480 | 40 | 0.23 | 460 | 2.5 | 2 | 1 | CS |
| 15 | 450 | 5 | 5 | −40 | 480 | 40 | 0.23 | 460 | 0 | 4 | 5 | CS |

*CS: Comparative Sample,
**IS: Inventive Sample

As shown in Table 1, in inventive samples satisfying coiling conditions of the embodiments of the present disclosure, uniform internal oxide layers were formed just below the surfaces of the steel sheets, and the internal oxide layers prevented surface concentration and oxidation of alloying elements such as manganese (Mn). Therefore, coating failure and peeling of coating layers in processing processes were not observed.

However, in comparative samples not satisfying the coiling conditions of the embodiments of the present disclosure, internal oxide layers were not formed, or uneven internal oxide layers were formed. Therefore, surface concentration and oxidation of alloying elements such as manganese (Mn) were not prevented, and thus coating failure and peeling of coating layers in processing processes were observed.

TABLE 2

| | Coiling | | Heating conditions | | | | Galvanizing bath | | | Coating surface quality | | | |
|---|---|---|---|---|---|---|---|---|---|---|---|---|---|
| | | | Hydrogen | Dew | Heating | | Steel sheet dipping | Al | Galvanizing bath | | | | |
| No. | Te, (°C.) | Time (h) | content (%) | point (°C.) | Te, (°C.) | Time (sec) | Te, (°C.) | Content (%) | Te, (°C.) | Coating grades | Coating adhesion | Ripple mark | Notes |
| 1 | 550 | 2 | 5 | 0 | 480 | 40 | 480 | 0.23 | 460 | 4 | 5 | x | *CS |
| 2 | 550 | 2 | 5 | −10 | 480 | 40 | 480 | 0.23 | 460 | 2 | 1 | x | **IS |
| 3 | 550 | 2 | 5 | −20 | 480 | 40 | 480 | 0.23 | 460 | 1 | 1 | x | IS |
| 4 | 550 | 2 | 5 | −60 | 480 | 40 | 480 | 0.23 | 460 | 1 | 1 | x | IS |
| 5 | 550 | 2 | 5 | −80 | 480 | 40 | 480 | 0.23 | 460 | 1 | 1 | x | IS |
| 6 | 550 | 2 | 5 | −40 | 460 | 40 | 480 | 0.23 | 460 | 3 | 3 | ○ | CS |
| 7 | 550 | 2 | 5 | −40 | 480 | 40 | 480 | 0.23 | 460 | 1 | 1 | x | IS |
| 8 | 550 | 2 | 5 | −40 | 500 | 40 | 480 | 0.23 | 460 | 1 | 1 | x | IS |
| 9 | 550 | 2 | 5 | −40 | 600 | 40 | 480 | 0.23 | 460 | 1 | 1 | x | IS |
| 10 | 550 | 2 | 5 | −40 | 650 | 40 | 480 | 0.23 | 460 | 3 | 4 | x | CS |
| 11 | 550 | 2 | 5 | −40 | 480 | 40 | 480 | 0.10 | 460 | 2 | 1 | ○ | CS |
| 12 | 550 | 2 | 5 | −40 | 480 | 40 | 480 | 0.13 | 460 | 1 | 1 | x | IS |
| 13 | 550 | 2 | 5 | −40 | 480 | 40 | 480 | 0.18 | 460 | 1 | 1 | x | IS |
| 14 | 550 | 2 | 5 | −40 | 480 | 40 | 480 | 0.25 | 460 | 1 | 1 | x | IS |
| 15 | 550 | 2 | 5 | −40 | 480 | 40 | 480 | 0.30 | 460 | 3 | 1 | ○ | CS |
| 16 | 550 | 2 | 5 | −40 | 480 | 40 | 460 | 0.23 | 460 | 2 | 1 | ○ | CS |
| 17 | 550 | 2 | 5 | −40 | 480 | 40 | 480 | 0.23 | 460 | 1 | 1 | x | IS |
| 18 | 550 | 2 | 5 | −40 | 480 | 40 | 500 | 0.23 | 460 | 1 | 1 | x | IS |
| 19 | 550 | 2 | 5 | −40 | 480 | 40 | 520 | 0.23 | 460 | 2 | 1 | ○ | CS |
| 20 | 550 | 2 | 5 | −40 | 480 | 40 | 480 | 0.23 | 440 | 2 | 1 | ○ | CS |
| 21 | 550 | 2 | 5 | −40 | 480 | 40 | 480 | 0.23 | 480 | 1 | 1 | x | IS |
| 22 | 550 | 2 | 5 | −40 | 480 | 40 | 480 | 0.23 | 500 | 1 | 1 | x | IS |
| 23 | 550 | 2 | 5 | −40 | 480 | 40 | 480 | 0.23 | 520 | 1 | 1 | ○ | CS |

*CS: Comparative Sample,
**IS: Inventive Sample

As shown in Table 2, in inventive samples satisfying coiling, heating (before galvanizing), and galvanizing conditions of the embodiments of the present disclosure, oxide films were not formed at the interfaces between coating layers and the steel sheets, and Fe—Mn—Al—Si—Zn interfacial inhibition layers were formed. Therefore, hot-rolled hot-dip galvanized steel sheets could be manufactured without coating failure, peeling of coating layers, and surface defects such as a ripple mark.

However, in comparative samples satisfying coiling conditions of the embodiments of the present disclosure, but not satisfying heating (before galvanizing) and galvanizing conditions of the embodiments of the present disclosure, coating failure or peeling of coating layers were observed due to grain boundary oxidation, or surface defects such as ripple marks were observed on the surfaces of coating layers due to a high degree of fluidity of molten zinc of a galvanizing bath.

EXAMPLE 2

Hot-rolled steel sheets formed as described in Example 1 were subjected to hot coiling, heating, galvanizing, and alloying processes under the conditions shown in Table 3 so as to manufacture hot-rolled hot-dip galvannealed steel sheets.

The degree of alloying and powdering characteristics of the hot-rolled hot-dip galvannealed steel sheets was evaluated as shown in Table 3.

The degree of alloying of each hot-rolled hot-dip galvannealed steel sheet was evaluated by dissolving a coating layer in a dilute acid solution and quantitatively analyzing the contents of iron (Fe) and manganese (Mn) by using inductively coupled plasma (ICP). The powdering characteristic of each hot-rolled hot-dip galvannealed steel sheet was evaluated by performing a 60-degree bending test on the steel sheet, attaching tape to an inner side of a bent portion, detaching the tape, and observing the width (area) of an alloying layer (film) peeled from the steel sheet and stuck to the tape. The powdering characteristic of each hot-rolled hot-dip galvannealed steel sheet was graded based on the observed width as follows.

Grade 1: no peeling
Grade 2: the width of peeling is 2 mm or less
Grade 3: the width of peeling ranges from 2 mm to 5 mm
Grade 4: the width of peeling ranges from 5 mm to 10 mm
Grade 5: the width of peeling is 10 mm or greater

TABLE 3

| | | | | | | | Galvanizing conditions | | | | | | | |
| | | | | | | | Steel | | | Alloying | | | | |
| | Coiling | | Heating conditions | | | | sheet | | Galvanizing | conditions | | Characteristics | | |
| | Te, | Time | Hydrogen content | Dew point | Heating Te, | Time | dipping Te, | Al content | bath Te, | Alloying Te, | Alloying time | Alloying | | |
| No. | (° C.) | (h) | (%) | (° C.) | (° C.) | (sec) | (° C.) | (%) | (° C.) | (° C.) | (sec) | degree | Powdering | Notes |
|---|---|---|---|---|---|---|---|---|---|---|---|---|---|---|
| 1 | 550 | 2 | 5 | −40 | 480 | 40 | 480 | 0.11 | 460 | 480 | 35 | 5.5 | Not alloyed | 72 CS |
| 2 | 550 | 2 | 5 | −10 | 480 | 40 | 480 | 0.11 | 460 | 500 | 35 | 8 | 1 | IS |
| 3 | 550 | 2 | 5 | −20 | 480 | 40 | 480 | 0.11 | 460 | 520 | 35 | 9.2 | 1 | IS |
| 4 | 550 | 2 | 5 | −40 | 480 | 40 | 480 | 0.11 | 460 | 460 | 35 | 12.0 | 2 | IS |
| 5 | 550 | 2 | 5 | −60 | 480 | 40 | 480 | 0.11 | 460 | 580 | 35 | 14.8 | 4 | CS |
| 6 | 550 | 2 | 5 | −40 | 460 | 40 | 480 | 0.07 | 460 | 520 | 35 | 15.8 | 5 | CS |
| 7 | 550 | 2 | 5 | −40 | 480 | 40 | 480 | 0.05 | 460 | 520 | 35 | 13.2 | 2 | IS |
| 8 | 550 | 2 | 5 | −40 | 500 | 40 | 480 | 0.11 | 460 | 520 | 35 | 9.2 | 1 | IS |
| 9 | 550 | 2 | 5 | −40 | 600 | 40 | 480 | 0.13 | 460 | 520 | 35 | 7.8 | 1 | IS |
| 10 | 550 | 2 | 5 | −40 | 700 | 40 | 480 | 0.15 | 460 | 520 | 35 | 4.2 | Not alloyed | CS |

*CS: Comparative Sample,
**IS: Inventive Sample

As shown in Table 3, in hot-rolled hot-dip galvannealed steel sheets satisfying conditions of the embodiments of the present disclosure, alloying failure or powdering caused by over-alloying were not observed.

However, in hot-rolled hot-dip galvannealed steel sheets not satisfying the conditions of the embodiments of the present disclosure, alloying failure or powdering caused by over-alloying were observed.

The invention claimed is:

1. A high-manganese hot-rolled galvanized steel sheet comprising:
 a hot-rolled steel sheet comprising 5 wt % to 35 wt % manganese; and
 a zinc coating layer formed on the hot-rolled steel sheet, wherein an internal oxide layer is formed in an internal region of the hot-rolled steel sheet facing the zinc coating layer,
 wherein the internal oxide layer has a thickness of 1 μm to 5 μm, and
 wherein an interface between the zinc coating layer and the hot-rolled steel sheet includes a Fe—Mn—Al—Zn interfacial inhibition layer.

2. The high-manganese hot-rolled galvanized steel sheet of claim 1, wherein the hot-rolled steel sheet comprises, by wt %, C: 0.1% to 1.5%, Mn: 5% to 35%, Si: 0.1% to 3%, Al: 0.01% to 6%, Ni: 0.1% to 1.0%, Cr: 0.1% to 0.4%, Sn: 0.01% to 0.2%, Ti: 0.01% to 0.2%, B: 0005% to 0.006%, and the balance of Fe and inevitable impurities.

3. The high-manganese hot-rolled galvanized steel sheet of claim 1, wherein the zinc coating layer is formed by a hot-dip galvanizing method or a hot-dip galvannealing method.

* * * * *